United States Patent
Davis et al.

(10) Patent No.: US 11,733,975 B1
(45) Date of Patent: Aug. 22, 2023

(54) SYSTEM AND METHOD FOR MIGRATING LEGACY SOFTWARE TO A SYSTEM COMMON ARCHITECTURE

(71) Applicant: Architecture Technology Corporation, Minneapolis, MN (US)

(72) Inventors: Paul C. Davis, Saratoga, CA (US); Douglas Sweet, Sunnyvale, CA (US); Erin Gambucci, San Jose, CA (US)

(73) Assignee: Architecture Technology Corporation, Minneapolis, MN (US)

(*) Notice: Subject to any disclaimer, the term of this patent is extended or adjusted under 35 U.S.C. 154(b) by 0 days.

(21) Appl. No.: 17/543,006

(22) Filed: Dec. 6, 2021

Related U.S. Application Data

(63) Continuation of application No. 17/003,201, filed on Aug. 26, 2020, now Pat. No. 11,194,550, which is a continuation of application No. 16/262,409, filed on Jan. 30, 2019, now Pat. No. 10,782,936.

(51) Int. Cl.
| | |
|---|---|
| *G06F 9/44* | (2018.01) |
| *G06F 8/72* | (2018.01) |
| *G06F 9/445* | (2018.01) |
| *G06F 9/455* | (2018.01) |
| *G06F 8/30* | (2018.01) |
| *G06F 8/76* | (2018.01) |

(52) U.S. Cl.
CPC ............ *G06F 8/30* (2013.01); *G06F 8/72* (2013.01); *G06F 8/76* (2013.01)

(58) Field of Classification Search
CPC ............ G06F 8/30; G06F 8/72; G06F 8/76
See application file for complete search history.

(56) References Cited

U.S. PATENT DOCUMENTS

| | | | |
|---|---|---|---|
| 9,558,441 B2* | 1/2017 | Bachelor | G06F 9/541 |
| 10,324,712 B1* | 6/2019 | Nolan | G06F 8/72 |

OTHER PUBLICATIONS

Zhao et al., Code Refactoring Based on MapReduce in Cloud Migration, 2 pages (Year: 2018).*

* cited by examiner

*Primary Examiner* — Thuy Dao
(74) *Attorney, Agent, or Firm* — Key IP Law Group, PLLC

(57) ABSTRACT

A software migration system includes a processor; a user interface that receives and displays components of a legacy software and a new software system; and a migration program as machine instructions stored on a non-transitory, computer-readable storage medium. The processor executes to identify reference models, standards, and requirements of a system common architecture that together define a process for migrating the legacy software to the new software system; load the legacy software onto a virtual machine instantiated on a dedicated hardware platform; refactor the legacy software; subdivide the refactored legacy software into legacy software subsets; move a first legacy software subset to a second virtual machine instantiated on the hardware platform; for a second legacy software subset, adapt the second legacy software subset to the system common architecture; and combine the adapted second legacy software subset and the first legacy software subset to produce the new software system.

18 Claims, 11 Drawing Sheets

SYSTEM AND METHOD FOR MIGRATING LEGACY SOFTWARE TO A SYSTEM COMMON ARCHITECTURE

RELATED APPLICATIONS

This application is a continuation of U.S. patent application Ser. No. 17/003,201 filed Aug. 26, 2020, entitled System and Method for Migrating Legacy Software to a System Common Architecture, now U.S. Pat. No. 11,194,550, issued Dec. 7, 2021, which is a continuation of U.S. patent application Ser. No. 16/262,409, filed Jan. 30, 2019, now U.S. Pat. No. 10,782,936, issued Sep. 22, 2020, entitled Programming Migration System and Method. The disclosures of these patents and patent applications are hereby incorporated by reference.

STATEMENT OF FEDERALLY SPONSORED RESEARCH

The invention was made with government support under FA8750-17-C-0230 and FA8750-19-C-0049, both awarded by the U.S. Department of the Air Force. The U.S. Government has certain rights in the invention.

BACKGROUND

Organizations may desire or need to update legacy software systems that operate through execution of program language. The updates may be needed to make the legacy software systems more resistant to cyber warfare attacks and/or to make legacy software systems compatible with modern program languages and modern hardware platforms. Updates also may be desired to make all legacy software systems compatible through migration to a common program language or common software architecture. Updates may be desired when either the legacy software system or the hardware on which it is implemented becomes obsolete; for example, when the organization is notified that its legacy software system program language no longer will be supported.

Development of a software system may begin by employing a structured development methodology, such as arranging the software system into components or modules. Modules may be used to group software code according to functions and related data structures that collectively perform a specific task or service. These and other software design guidelines may be easy to implement at the start of a new software development project; however, the design guidelines may be violated as software development evolves, and later, when updating the software system. Furthermore, multiple programmers may edit or write software code for an application, and a first programmer may be unfamiliar with software code that was drafted by a second programmer. This lack of familiarity may lead to coding errors that may be hard to detect. As a result, an organization may employ software systems or applications, having millions of lines of code, that are sub-optimum when initially invoked, and that degrade over time because of maintenance issues associated with maintaining code that violates intended software design principles. Thus, organizations maintaining large legacy software systems may spend considerable amounts of time, effort, and money (i.e., resources) in running these legacy software systems. Furthermore, considerable resources may be required just to identify badly performing software module(s). Conventional tools may help programmers understand a program flow of a legacy software system, and assess the effect on such a legacy software system if code changes are implemented. However, these conventional tools may not allow the programmer to identify with enough granularity or precision, which specific modules, functions, and data structures of the legacy software system are deteriorating and what steps should be taken to correct the deterioration. In addition, conventional tools may not be time efficient and their use may be prone to human errors. These problems may be exacerbated when the original programmers of a legacy software system are no longer available and/or when little or no documentation exists for the legacy software system. By the time an organization decides to migrate a legacy software system to a new or replacement hardware system, all the problems noted above may be magnified.

SUMMARY

A computer-implemented method for migrating a monolithic legacy software system to a well-defined modular target software architecture includes selecting a method, based on predefined patterns, for transforming the software legacy software system; creating an abstract syntax tree from the legacy software system's source code; from the abstract syntax tree, determining a flow of the source code and any coding violations and coding smells in the legacy software system's source code; using the flow and the coding violations, identifying architecture issues in the legacy software system; scheduling tasks for transforming the legacy software system into the target software architecture; automatically generating new source code according to the target software architecture; and automatically and autonomously refactoring legacy source code.

A non-transient computer-readable storage medium having encoded thereon machine instructions for migrating a monolithic legacy software system to a well-defined modular target software architecture, the instructions when executed, causing a processor to select a method, based on predefined patterns, for transforming the software legacy software system; create an abstract syntax tree from the legacy software system's source code, wherein the source code may be in one or more computer languages; from the abstract syntax tree, determine a flow of the source code and any coding violations and coding smells in the legacy software system's source code, using the flow and the coding violations, identify architecture issues in the legacy software system; schedule tasks for transforming the legacy software system into the target software architecture; automatically generate new source code according to the target software architecture; and automatically and autonomously refactor legacy source code.

A system for migrating a monolithic legacy software system to a well-defined modular target software architecture includes a user interface for receiving the legacy software system and for implementing an optimum migration path to the target software architecture; a processor in communication with the user interface; and a migration system comprising machine instructions stored on a non-transitory computer-readable storage medium. The processor executes the machine instructions to select a method, based on predefined patterns, for transforming the software legacy software system, create an abstract syntax tree from the legacy software system's source code, wherein the source code may be in one or more computer languages, from the abstract syntax tree, determine a flow of the source code and any coding violations and coding smells in the legacy software system's source code, using the flow and the coding violations, identify architecture issues in the legacy software system, schedule tasks for transforming the legacy software system into the target software architecture; automatically generate new source code according to the target software architecture; and automatically and autonomously refactor legacy source code and the new source code. The refactoring of the new source code includes the processor receiving an identification of coding smells for the new source code and appropriate software metrics for the software module; for each coding smell, determining one or more refactoring steps; predicting an optimal refactoring order by determining a refactoring order that maximizes an expected sum of two or more measurable quantity terms associated with the refactoring order; and executing the optimal refactoring order.

DESCRIPTION OF THE DRAWINGS

The detailed description refers to the following figures in which like numerals refer to like objects, and in which.

DETAILED DESCRIPTION

Figure 1A:
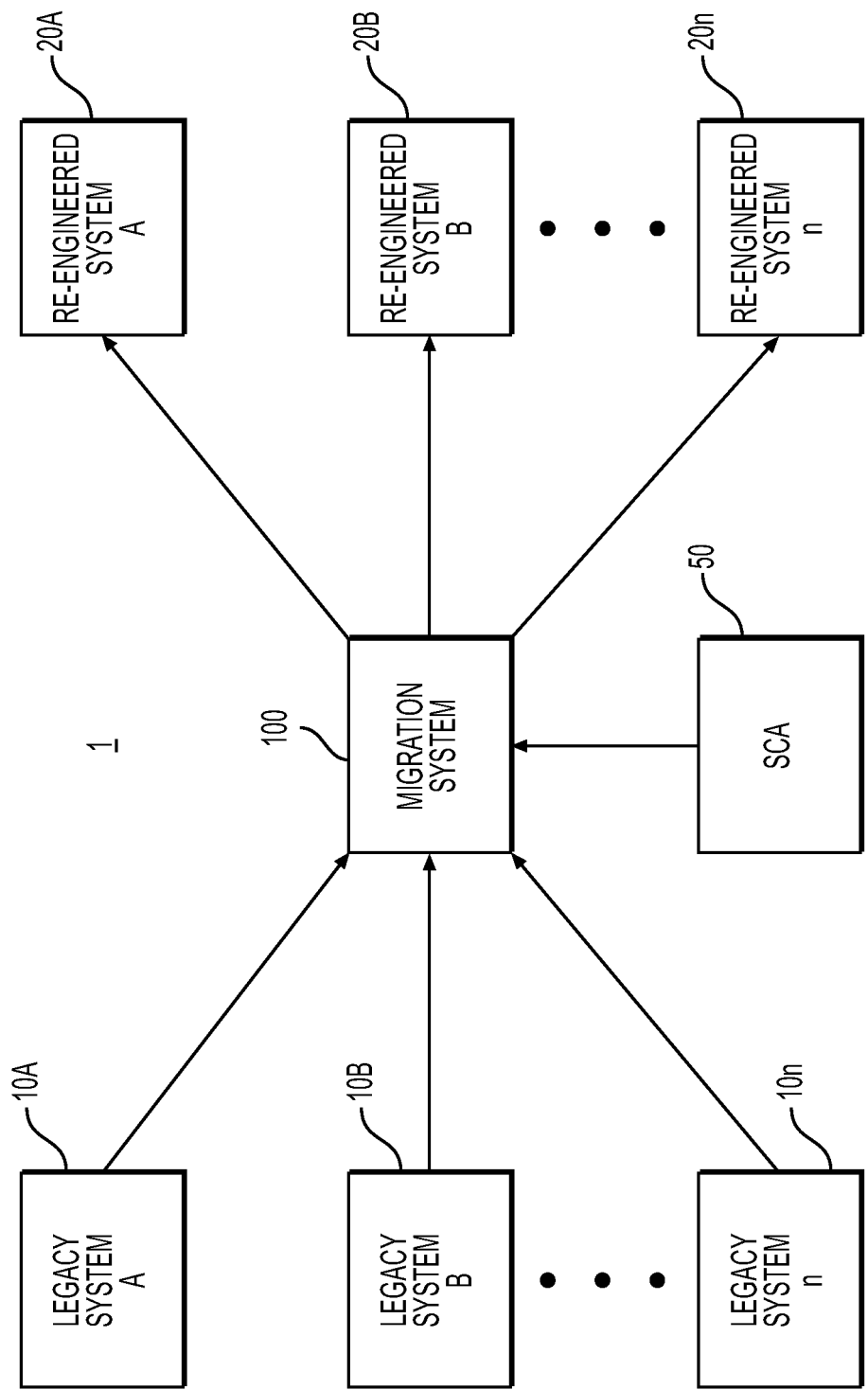
FIG. 1A illustrates a network in which a programming migration system, and corresponding methods, may be implemented.

Migrating a sophisticated, high-performance legacy software system to a modern, modular, common and secure software system and its associated hardware architecture is complicated. The legacy software system may function well, but may be based on obsolete constructs, making the legacy software system costly to sustain. Migrating such a legacy software system to a modern and secure software and hardware architecture may be complicated, expensive, and time consuming. The legacy software system (1) may be written in one or more legacy languages such as Ada or FORTRAN; (2) may be tightly-coupled to specific/specialized hardware, operating systems, or outdated technology; (3) may have undetected security vulnerabilities; and (4) the expertise to fully understand the legacy source code (e.g., original developers, updated design documentation) may not be available. However, the legacy software system may encapsulate features an organization desires to retain, and thus, an update process may involve adapting the legacy software system program language or software architecture by translating or migrating the legacy software system program language into a modern program language.

To overcome deficiencies in current software development and maintenance tools and associated methods, disclosed herein are a programming migration system and corresponding methods. The system and methods address a need for efficiently assessing, migrating, and improving a legacy software system. Furthermore, the system and methods may be used to prevent performance degradation when a software system initially is being developed or during software system migration. The system may include, and the corresponding methods may employ, a software tool that recommends prescriptions/remedies and evaluates their effect on software system performance before changes in the software system are implemented.

An existing network may include many legacy systems. Some legacy systems may include a computing platform with one or more processors. Some legacy systems may employ a specific computing program, and many different computing programs may be employed in the network. Network performance may be improved by updating one or more of the legacy systems. An example update process may be based on implementing a system common architecture (SCA) on one or more of the legacy systems that together form the existing network. The SCA may include requirements, standards, and reference models that together define how to re-engineer or re-purpose a legacy system into a modern, updated system. The requirements and standards may be used to provide possible migration approaches, provide analysis criteria to examine and evaluate legacy system source code, and identify and quantify the challenges that such migration approaches may entail. The SCA then may be employed by a SCA migration toolkit (SCA-MT) to re-engineer the legacy system into the modern, updated system. Thus, the SCA-MT provides tools that allow programmers and engineers to plan, monitor, and evaluate the transition from legacy system to updated system. In an example, some legacy software system changes may be executed through automated code generation.

The updating methods may include re-engineering the legacy software systems. The updating methods may have as a focus migrating programming languages used to control hardware components into modern, efficient, and sustainable programming languages. In an example, an updating method includes use of a virtual machine (VM) to run the legacy software system on a different hardware platform. This example may be the fastest and least costly approach to migration as the method allows for quickly consolidating hardware infrastructure and thus may be desirable for systems that are close to being retired or that may be too costly to re-engineer. However, this example may make only minimal use of the SCA. In another example, an updating method replaces or modernizes certain modules or other elements of the legacy software system, such as replacing the graphics library, database, communications protocols, and making small architectural changes. With this example, maintenance and performance efficiency are improved through closer alignment of the re-engineered legacy software system with the technology used by the SCA. However, with this example, the SCA still may be underutilized. Yet another example involves re-engineering the entire legacy system to be fully compatible with the SCA, thereby achieving the goal of using a common platform, which may lower sustainment costs during the re-engineered system's lifetime. This example may be more challenging and costlier (initially) than other examples. Furthermore, aspects of the examples may be combined, or may be used in a phased migration approach. For example, one module or component of the legacy software system could remain unaltered and moved to a virtual machine while other modules or components could be upgraded or modernized, and still other components could be completely re-engineered. This approach may be executed in multiple phases. Successive phases could continue to transform the legacy software system until the re-engineered software system is fully compatible with the SCA.

FIG. 1A illustrates an example legacy network that contains a number of individual legacy systems, some of which in turn include a number of legacy software systems and legacy hardware systems. Some legacy software systems include legacy modules and components. The legacy hardware systems may include computer-controlled hardware (e.g., a computer numerical control (CNC) machine that produces automobile parts or devices). Network operators may desire to upgrade the individual legacy systems including updating legacy software system programming and or legacy hardware systems. As an example, the network may be a complex manufacturing facility that employs CNC machines (i.e., computer-controlled hardware) in a production line scheme to semi-autonomously produce devices, assemble those devices into finished products, and distribute the finished products. Some CNC machines employ a specific or general hardware platform with a number of specific components. Some CNC machines may include, or may be coupled to, a specifically-programmed computer. The computer executes the computer program to control the CNC machine.

In this example network, some controlling computers may be connected to an open communications network, and thus may be susceptible to a cyber warfare attack. As new cyber threats appear, the controlling computers may become more at risk, thereby necessitating changes to programming languages used by the controlling computers. The hardware platforms and their components (i.e., the CNC machines) may require design changes in order to produce desired finished products, or because of changes in supplied materials that are transformed into the finished products. These changes also may require reprogramming the controlling computers used to operate the CNC machines. The program language used in the controlling computers may become obsolete or unsupported, and thus the controlling computers may require reprogramming. The controlling computers also may become obsolete with time and thus may require replacement and programming with updated program code. As a result, the example network of FIG. 1A may be in continual or near-continual flux as product designs change and machine and software become obsolete.

Another example network may be a communications system with multiple, different platforms, displays, communications mechanisms, and computing devices. Yet another example network may be an interactive training network with multiple, different hardware and software systems that provide specific training programs and services. In general, the network may include any number of the same or different computing platforms, with the computing platforms providing information, and in some networks, controlling operations of specific machines. Furthermore, the networks may be coupled to a public network such as the Internet or may be formed as a private network. The network may include wired and wireless computing platforms. In an aspect, the network may grow over time, with additional computer-controlled systems added when required by finished product design and specification, or for other reasons.

Yet another example network may be a cluster of simulators used for training purposes. Cyber threats and obsolescence may affect the operability of such a simulator network. In particular, simulator software systems and hardware systems may change (improve) rapidly as the actual hardware systems they simulate change or are replaced. To control simulator network costs while maintaining peak viability and conformance to the actual hardware system, network operators could implement a modular, open common architecture that would apply to all simulators in the network. However, migrating the existing simulator network to this common architecture, while paying dividends in the long run, may require significant near-term effort and resources. Furthermore, once migrated from its legacy architecture, the re-engineered simulator network may immediately begin a slow slide to obsolescence unless the re-engineered architecture includes the necessary tools to maintain the network at peak efficiency. Thus, in addition to the common architecture, a set of tools may be supplied to support the migration of the simulators to generate a common architecture, and thereafter to maintain and update the common architecture as actual hardware systems change or are replaced and as associated software systems available for use in the simulator network become obsolete, unavailable, or otherwise degraded. The tools should allow a programming team to accurately and efficiently analyze legacy simulator code—regardless of the language or platform—allowing the programming team, in a current migration and for possible future migrations, to fully understand the software system's attributes, including the structure and data flow. The analysis then may be used to compare the legacy simulator implementation to the common architecture, and to generate a roadmap for re-engineering the legacy software system.

In FIG. 1A, example network 1 is a production facility that makes, assembles, and distributes finished products. The network 1 includes legacy systems 10$i$ (legacy systems 10A, 10B, . . . 10$n$). Some legacy systems 10$i$ may be multiple copies of the same system. Other legacy systems 10$i$ may perform functions that are unique to those legacy systems 10$i$. A legacy system 10$i$ may include a hardware platform with hardware components and a programmed computer (not shown) to operate the hardware platform and its components. Alternately, two or more, or all of the hardware platforms may be controlled by a programmed central computer. The programmed computers execute programming that is a element of a legacy software system.

To upgrade performance in the network 1, and for other reasons, network operators intend to transform the legacy systems 10$i$ into repurposed or re-engineered systems 20$i$ (re-engineered systems 20A, 20B, . . . 20$n$). The transformation process may involve some hardware modification, but with most legacy system-to-re-engineered system transformations, the controlling computer of some legacy systems 10$i$ is reprogrammed to provide an up-to-date controlling computer for the re-engineered systems 20$i$. In an alternative process, some or all of the controlling computers may be replaced with improved computers (e.g., computers with more and faster memory, faster processors, improved hardware-based security features, and other improvements).

In FIG. 1A, to execute the computer reprogramming aspect of the system repurposing, the network 1 employs example programming migration system 100. The migration system 100 and its various components are illustrated and described in detail herein, including with respect to FIGS. 2-7. The migration system 100 facilitates programming controlling computers of the systems 10$i$, 20$i$ by providing a number of programming tools, ingesting data, and providing human-readable outputs. The migration system 100 may be implemented on a standalone computer platform (see FIG. 1B) and may execute to provide some of the re-engineered systems 20$i$ with a computer program according to the System Common Architecture (SCA) 50.

Figure 1B:
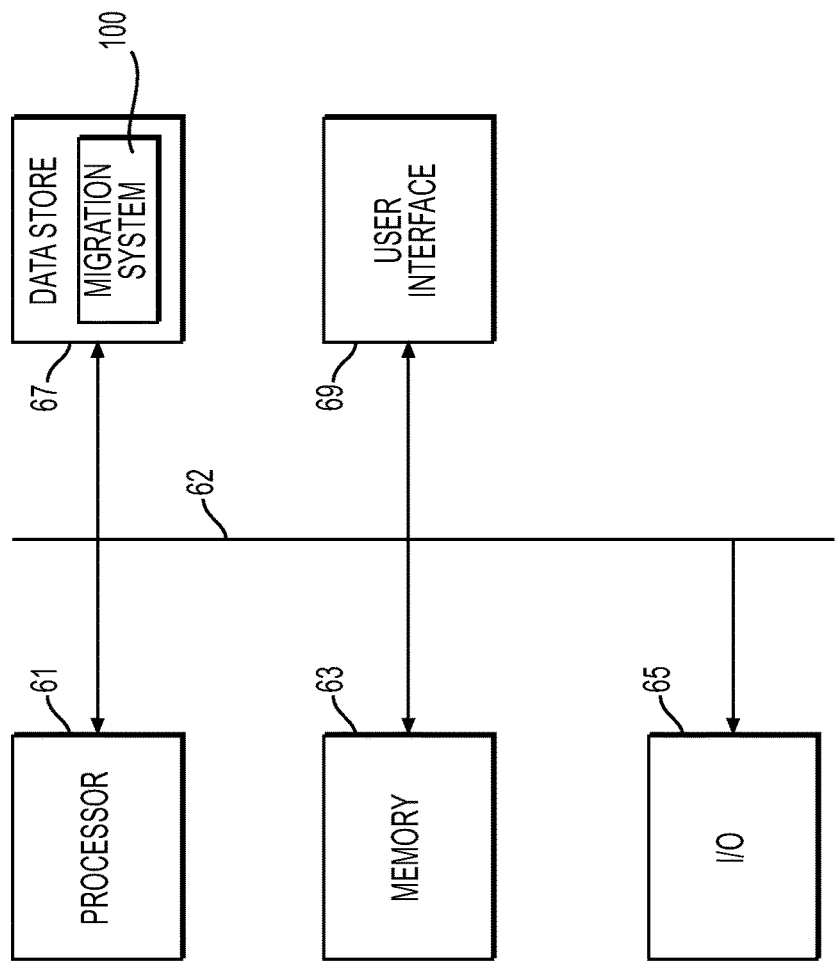
FIG. 1B illustrates an example implementation of the programming migration system of FIG. 1A.

FIG. 1B illustrates standalone computer platform 60 on which migration system 100 is implemented. Computer platform 60 includes processor 61, memory 63, input/output 65, data store 67, and user interface 69, all of which are connected through bus 62. The data store 67 is or includes a non-transitory computer-readable storage medium. The data store 67 stores migration system 100. The processor 61 loads the migration system 100 into memory 63 and then executes the migration system's machine instructions. The I/O 65 allows other computer systems and humans to provide inputs of data and instructions to the processor 61 and provides outputs of data and instructions to other computer systems and humans. The user interface 69 provides human-readable displays during execution of the migration system 100.

Figure 2:
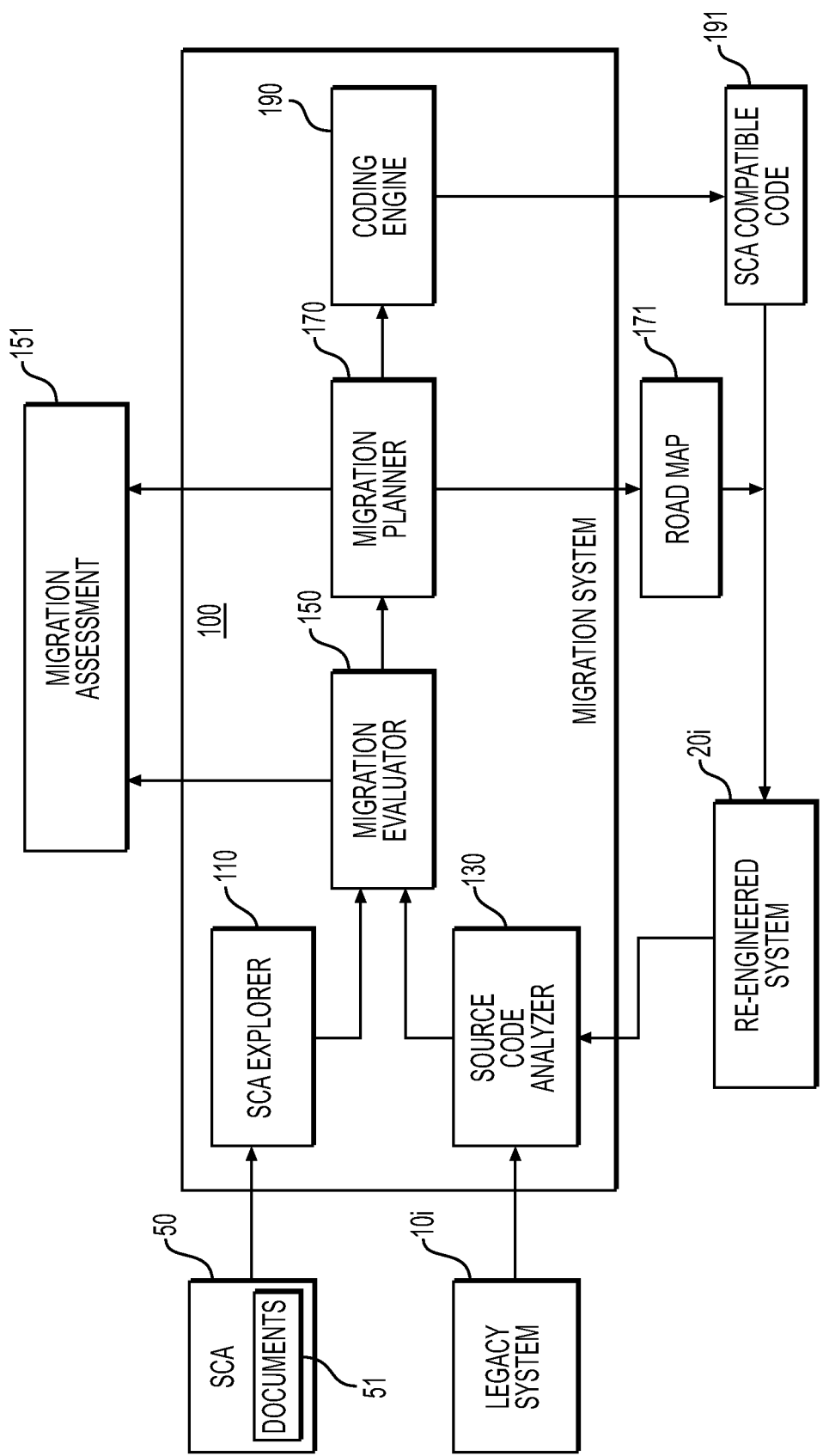
FIG. 2 illustrates an example programming migration system.

FIG. 2 illustrates an example programming migration system. In FIG. 2, migration system 100 includes SCA explorer 110, source code analyzer 130, migration evaluator 150, migration planner 170, and coding engine 190. These five components of the migration system 100 are described in more detail with reference to FIGS. 3-7, respectively. As shown in FIG. 2, the migration system 100 receives inputs from legacy systems 10i and documents 51 that form a part of SCA 50. The migration system 100 generates migration assessment 151, road map 171, and SCA compatible code 191. The SCA compatible code 191 is provided as an input to re-engineered systems 20i, which optionally provide an input to the source code analyzer 130. Finally, the migration assessment 151 is input to the migration planner 170.

Figure 3:
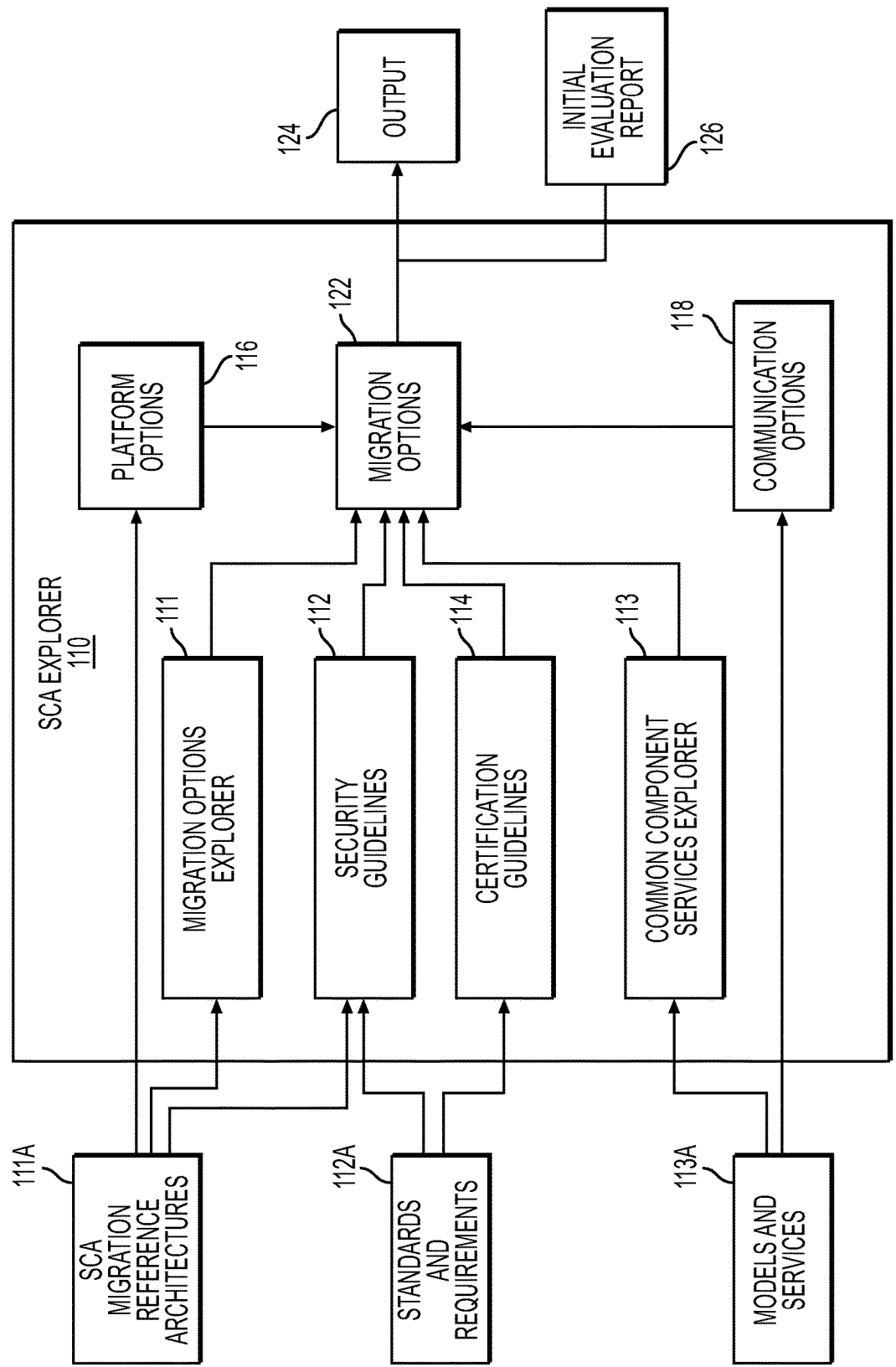
FIGS. 3-7 illustrate example components of the example system of FIG. 2.

FIG. 3 illustrates example SCA explorer 110, which provides capabilities for understanding the organization, behavior, services, and platforms provided by the SCA 50. The SCA 50 may provide one or more blueprints, templates, or reference architectures 111A for migrating legacy systems 10i to the SCA 50. The reference architectures 111A may represent some, but need not represent all, approaches that may be used for migration. Furthermore, the references architectures 111A need not include all possible architecture variations. In addition to migration reference architectures 111A, the SCA explorer 110 also may provide examples and best practices to guide programmers in understanding and selecting candidate migration approaches for updating the legacy systems 10i. The SCA explorer 110 also provides integrated access to standards and requirements 112A, including security, performance, governance, and certification, employed by the SCA 50 to help the programming team understand the constraints that may affect the reengineered system's architecture. SCA models and services 113A (e.g., data, message, and communication) provide the definitive specification of what SCA functionality or services are available to programmers. In an aspect, the models and services 113A are in a machine-readable form, e.g., XML, allowing them to be imported directly into the migration system 100.

As shown in FIG. 3, migration options explorer 111 accesses the reference architectures 111A to display migration options appropriate for specific platform options 116 and communications options 118. The displayed migration options may be determined based on outputs of security guidelines module 112, certification guidelines module 114, and common component/services explorer 113. The displayed options may be generated by migration options module 122, which may produce an electronic output 124. The migration options module 122 also may provide a human-viewable output of the migration options, such as initial evaluation report 126.

After using the SCA explorer 110 to understand the SCA, the programming team may choose one or more migration methods for consideration, based on what the programmers have learned and their current knowledge of the legacy system 10i. Any questions, concerns or risks the programmers may identify about the migration approach, along with their rationale for considering the approach, may be included in the initial evaluation report 126. The selected migration method (or methods) thus becomes a preliminary Target Reference Architecture. This migration approach is preliminary because a detailed analysis of the legacy system 10i still may need to be performed.

Figure 4:
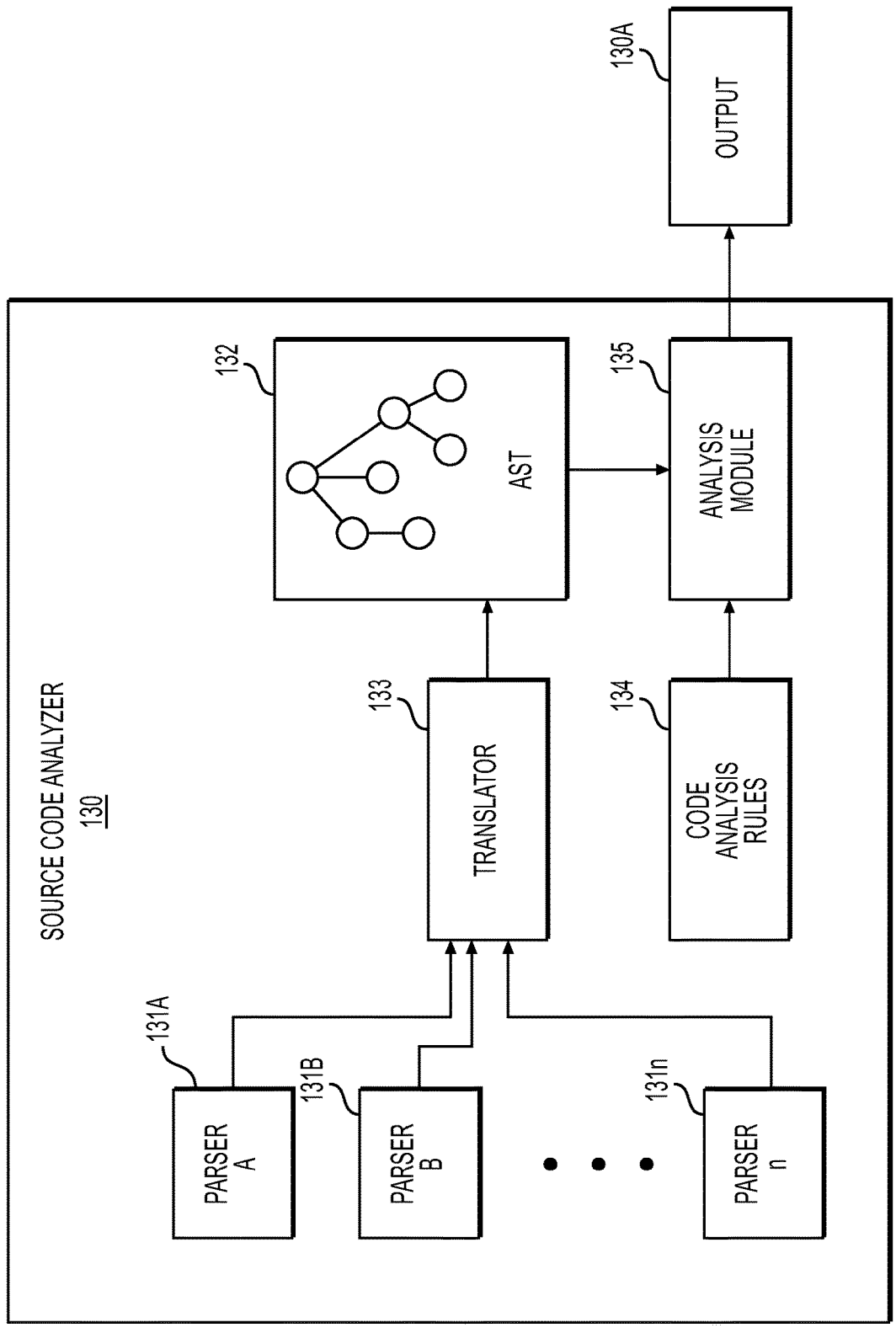

FIG. 4 illustrates example source code analyzer 130. The source code analyzer 130 includes source code parsers 131i (i.e., 131A-131n), source code translator 133, and source code analysis module 135. Specific language code parsers 131i read in source code used by the legacy systems 10i. In an aspect, the code parsers 131i may include one or more commercially available and open source code parsers. In another aspect, the code parsers 131i may be written as components of the migration system 100 to parse code used in the legacy systems 10i. The code parsers 131i provide an output to the code translator 133. The code translator 133, which may be a compiler, converts the parsed code into an abstract syntax tree (AST) 132. The AST 132 provides a representation of the source code of the legacy system(s) 10i that is conducive to analysis and allows programmers to understand the state of the legacy software system's architecture, which is critical to scoping the effort, risks, and costs associated with migrating the legacy system's architecture to the SCA 50. The analysis module 135 performs a detailed analysis of the existing (legacy) software system. The analysis module 135 receives as an input, the AST 132 and code analysis rules 134, which support the variety of computer languages used by the legacy systems 10i.

Using code analysis rules 134, the analysis module 135 determines the control flow, i.e., the sequence of function calls and the data flow, and how the values of variables change in the legacy system's architecture. The analysis module 135 also determines violations of specified coding principles, also known as coding "smells", that may indicate underlying problems. The code issues and flow diagrams are provided as output 130A, which may be used by other components of the migration system 100. The output 130A also may take the form of reports that may be reviewed programmers.

Thus, the source code analyzer 130 provides the programmers with a thorough understanding of the legacy system 10i that is to be migrated to the SCA 50. This knowledge may be helpful before undertaking the migration, especially because the legacy systems 10i may contain millions of lines of code that may have evolved over time, and may lack up-to-date or accurate design specifications.

Figure 5:
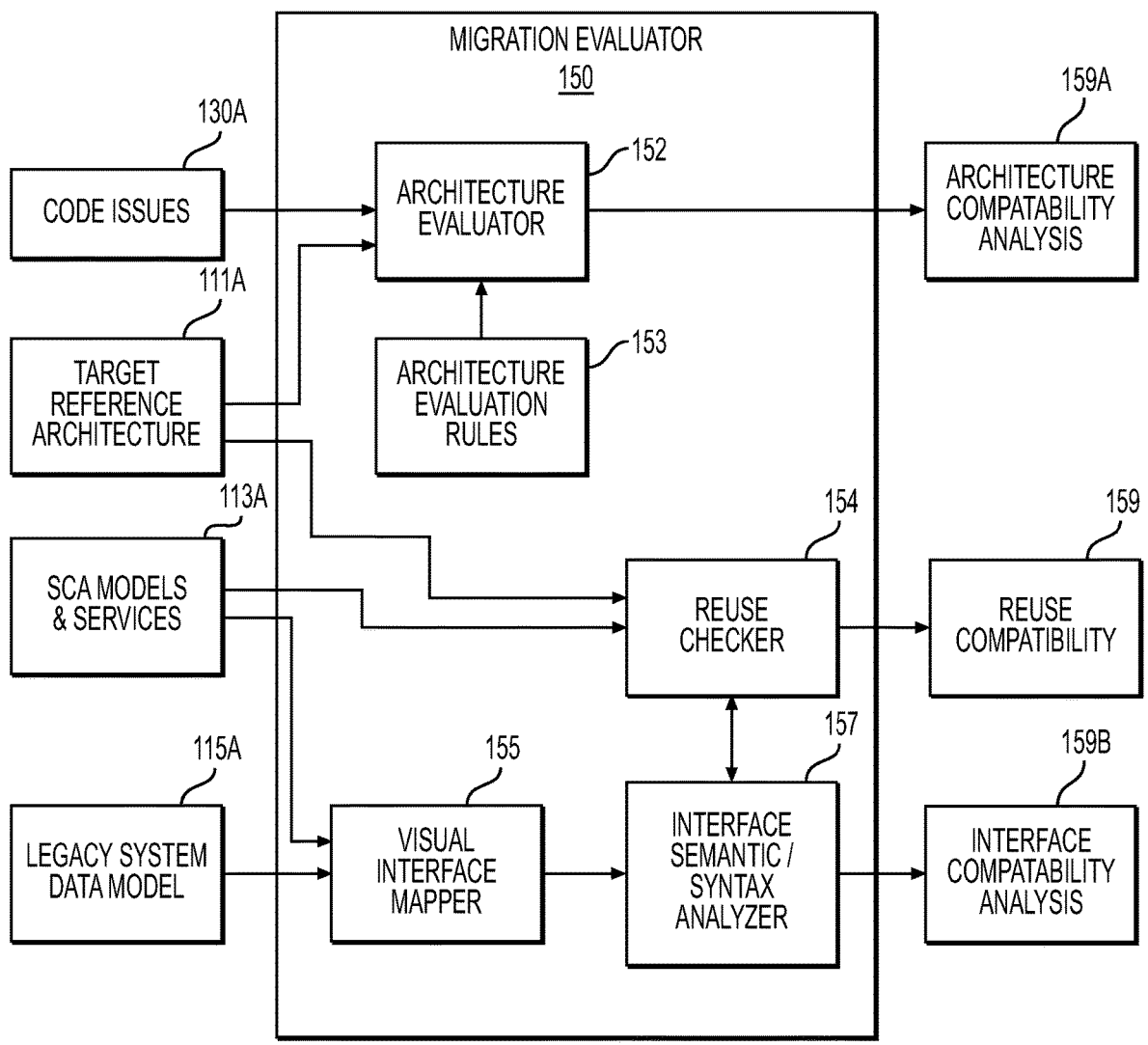

FIG. 5 illustrates example migration evaluator 150. Once a potential migration method is chosen and the existing legacy system(s) 10i has been analyzed, a more detailed analysis can be performed. This detailed analysis serves two purposes: first is to understand the issues facing a particular migration method and use that information to make an informed decision on whether to migrate using that method; second, once the decision to migrate is made, is to provide programmers with insights they may use for planning the migration. The migration evaluator 150 uses the output 124 of the SCA explorer 110 (including the target reference architecture 111A) and the source code analyzer 130 output 130A (code issues, flow models) to conduct an architecture gap analysis between the current state of the legacy system 10i and where it needs to go.

The migration evaluator 150 includes architecture evaluator 152, architecture evaluation rules 153, reuse checker 154, visual interface mapper 155 and interactive semantic/syntax analyzer 157. While the source code analyzer 130 identifies general code issues, the architecture evaluator 152 identifies issues that are more specific to SCA migration. The architecture evaluator 152 compares patterns in the code with rules 153 for identifying issues. The rules 153 may be customized, extended and tailored for the SCA 50. Types of issues could include structural issues such as tightly coupled modules; platform issues such as an unsupported framework; security issues such as an un-allowed system access; and other issues. Using the rules 153, the architecture evaluator 152 generates an architecture compatibility analysis 159A.

The architecture evaluator 152 also enhances reuse, i.e., the evaluator 152 makes sure the programmers leverage SCA provided services. The visual interface mapper 155 uses the SCA models and services 113A to provide programmers with the semantic and syntactic description of all the SCA services. Using the output 130A from the source code analyzer 130, a programmer may graphically map individual SCA data elements to legacy data elements. This mapping process may vary from one legacy system 10i to another legacy system 10i since the level of detail and documentation for some legacy systems 10i may vary. While the SCA models and services 113A provides precise data element definitions, the programmers may need to verify the data element semantics of the legacy systems 10i to complete the mapping process. For example, the SCA models and services 113A may contain an unambiguous specification for altitude, e.g., WGS84AltitudeMeters. A first legacy system 10i may have a corresponding specification with an ambiguous variable name for altitude, AltitudeFeet, along with a machine-readable data model, in which case the visual interface mapper 155 may execute automatically to correlate the two data elements. However, a second legacy system 10i may use an ambiguous variable name, e.g., AltitudeFeet, but does not have a machine-readable data model, in which case the visual interface mapper 155 may be used in a semi-automated mode to document the units and coordinate systems used by the second legacy system 10i. The semi-automated mode may require examining the second legacy system's source code; however, the previous data/flow analysis simplifies this task. Once the missing information has been captured, an effective data model of the legacy system 10i will exist. The interface semantic/syntax analyzer 157 automatically compares the mapped data models (i.e., compares the SCA 50 data model and the legacy system 10i data model), data element by data element, and identifies missing data elements, semantic/syntactic mismatches, and other issues, and produces an interface compatibility analysis 159B.

The reuse checker 154 uses the interface analysis results to evaluate the extent to which the SCA models and services 113A may be reused, and produces an analysis of reuse compatibility 159. Data elements published or generated by the legacy system 10i are compared to data elements published with the SCA models and services 113A. The programmers may use this information to identify duplicated functionality that may be replaced by the SCA provided by the models and services 113A. For example, the reuse checker 154 may determine that the legacy system 10i generates atmospheric pressure, temperature and density and these correspond to data elements provided by an SCA Atmosphere Service. The SCA Atmosphere Service also generates humidity, which is not found in the legacy system 10i data model. This difference, which may or may not be significant, is noted in the Reuse Compatibility Analysis 159 for review by programmers who then decide how the SCA Atmosphere Service may be used and the legacy atmosphere code removed.

Figure 6:
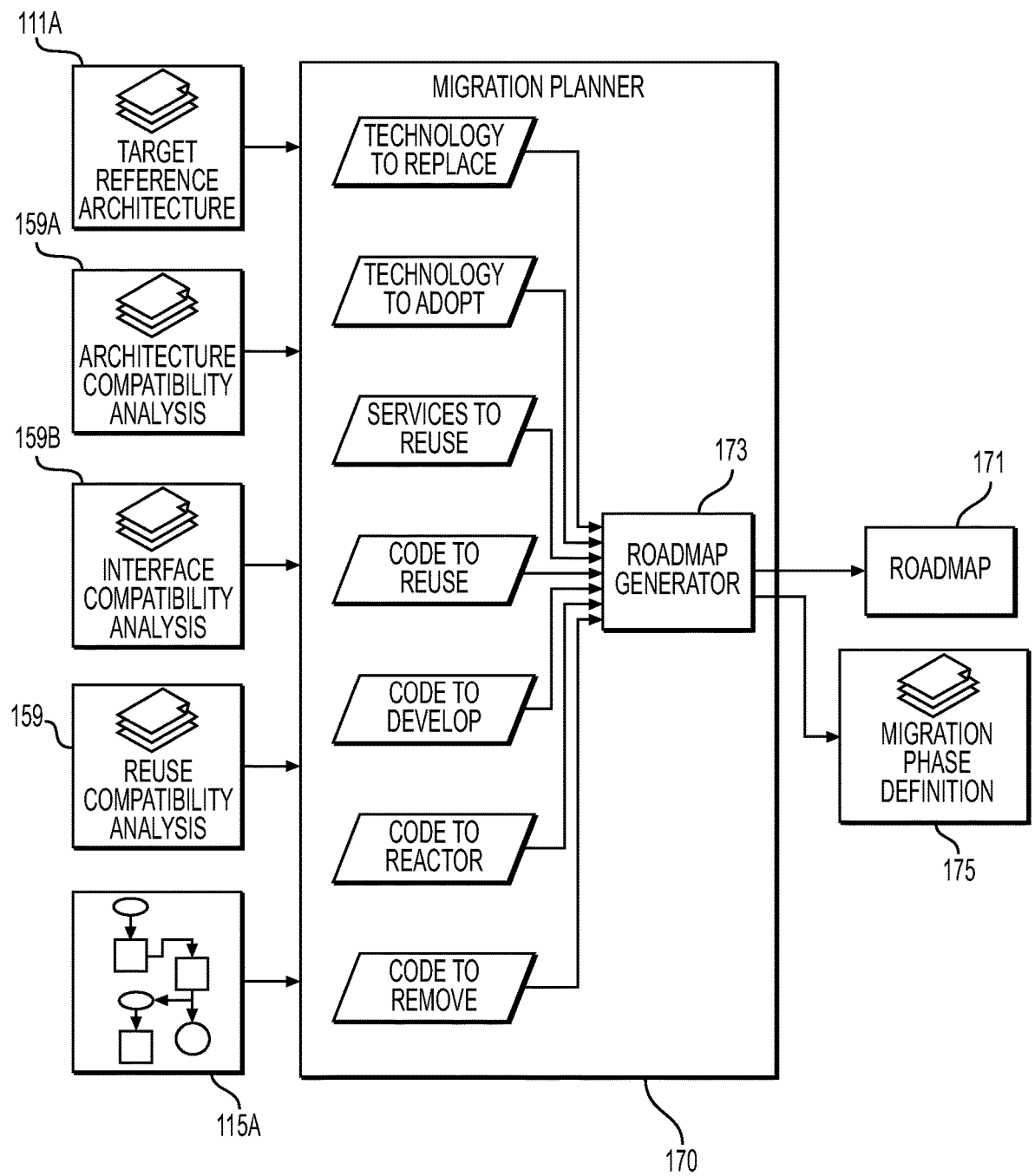

FIG. 6 illustrates example migration planner 170. Once the risks and issues are understood and there is a commitment to proceed with the migration, a migration plan may be developed. The migration planner 170 organizes the analysis results and migration decisions that have been made and allows the development of a migration roadmap 171 through execution of roadmap generator 173. A migration may be performed incrementally and the migration planner 170 helps planners allocate resources to specific phases, which may be provided in a migration phase definition 175, also generated by the roadmap generator 173. During a phased migration, the updated legacy system's source code may be reanalyzed by the SCA-MT at the beginning of some phases and the new analysis results incorporated into the planning/re-planning for the next phase.

Figure 7:
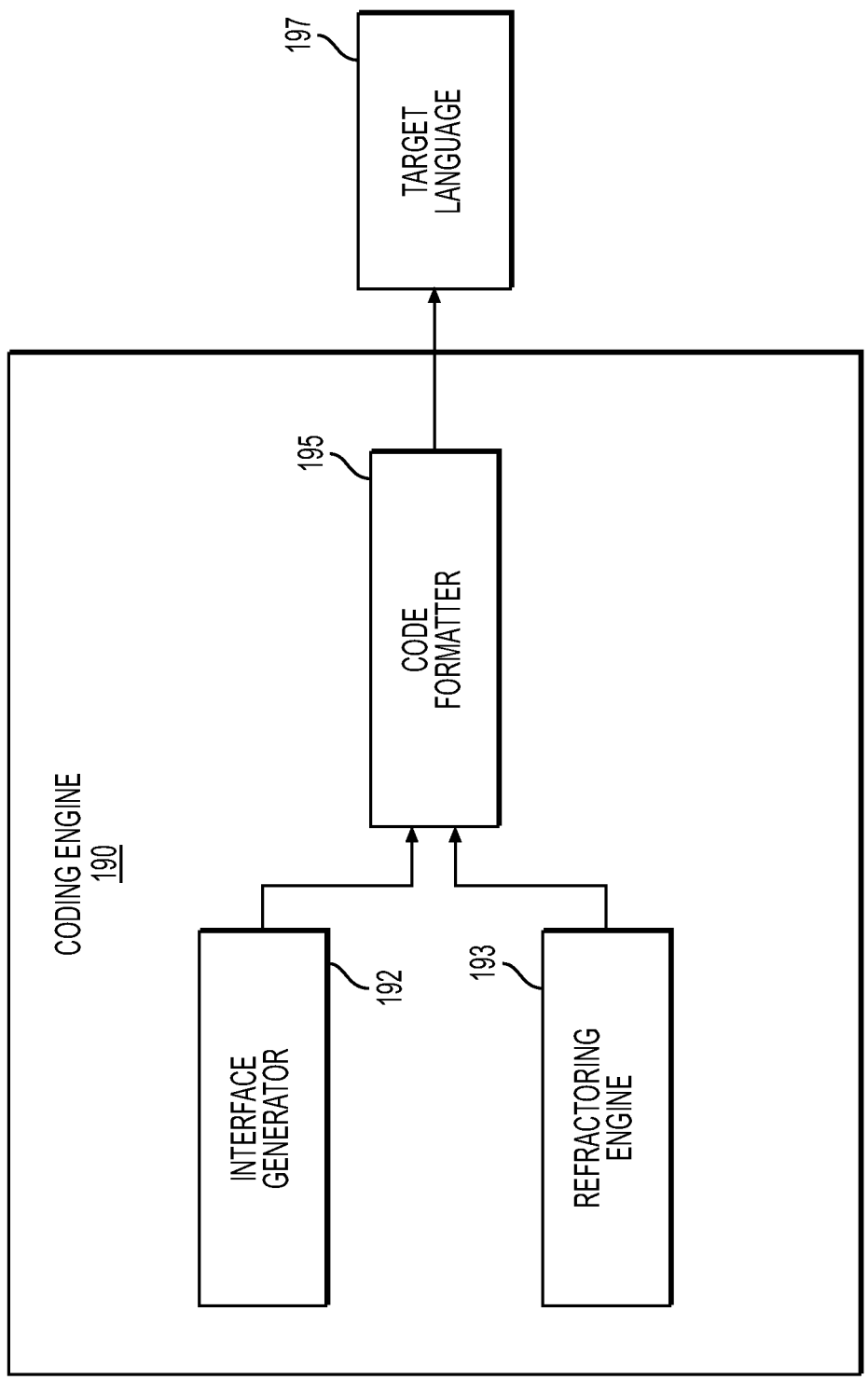

FIG. 7 illustrates example coding engine 190. In addition to aiding in planning the migration, the SCA-MT may automate portions of the actual migration. Automating even a part of the code development process may increase efficiency and code quality. The coding engine 190 automates all or part of the actual migration by encapsulating two main functions: code generation and code refactoring. Code generation is controlled by interface generator 192. The code generation function includes the steps of code analysis and design, code compilation, and code testing. Code compilation includes original code generation and follow-on code re-generation. Code refactoring, which may be continuous or step-wise, is controlled by refactoring engine 193. Finally, code formatter 195 provides the target program in a code language (e.g., target language 197) specified in the SCA.

The interface generator 192 automatically generates code for communicating with the SCA 50. The SCA models and services 113A specify the message set, and language specific templates and rules are used to generate program code that can be integrated into the re-engineered systems 20i. In an example, the interface generator 192 uses enterprise integration patterns to provide flexible and efficient options for migrating the legacy software system programming. For example, a message translator pattern, based on an adapter pattern, allows software systems with different data formats to communicate with each other. A message mapper pattern allows messages from one model to be mapped to messages from another. These patterns may be used to ease integration by mapping the SCA defined messages to the legacy software system's data model.

As noted herein, the design of software systems can exhibit several problems that may be due to inefficient analysis and design during the initial development of the software. In addition, the problems may arise due to software ageing since software quality may degenerate with time. Design problems may arise at the code or design level, and the process of removing or correcting the design problems is called refactoring, where the software structure is improved without any modification to its behavior. Thus, software refactoring provides guidelines for validated changes of the software system's internal structure while ensuring the preservation of its external behavior in terms of quality and reliability. Moreover, several refactoring steps may emerge during the software development cycle with a differing order of application. The refactoring order can have negative effects on the targeted software quality, reliability, and maintainability among other measures. However, revealing these negative effects only at the final stages of the software development cycle could be disastrous to the development efforts in terms of cost and reputation. Accordingly, the refactoring engine 193 may execute repetitively, in an automatic and autonomous fashion during all phases of the software development cycle.

Thus, the refactoring engine 193 helps automate the resolution of code and architecture issues identified by the SCA-MT analyses disclosed herein. In an example, the refactoring engine 193 uses machine learning and other artificial intelligence techniques to detect and resolve (i.e., correct) coding issues during the process of generating and/or migrating software system programming for the re-engineered systems 20i.

As noted herein, code (programming) also may become unstable or may atrophy over time or may become obsolete. In addition, during code generation as part of the migration process, coding problems (the manifestation of which sometimes is referred to as "smell") may occur. In an example, the coding engine 190, and more specifically the refactoring engine 193, identifies and corrects these "smells" by use of refactoring methods in which the internal structure of the legacy code and/or the newly-generated code is changed (improved) without altering the external behavior of the programming. Refactoring, then, is the process of fixing a bad or chaotic design that is identified by a coding "smell" by improving code structure and design thereby making the code more maintainable, easier to understand, easier to modify, and easier to add new features, and may be applied to correct problems noted or expected with legacy software systems as well as newly-developed software systems. The cumulative effect of refactoring is improved code design and prevention or delay of obsolescence. For example, bad (or smelly) code usually takes more lines of code to perform a function than would good code; the excessive code often is merely the result of unnecessary code duplication. The goal of refactoring in the presence of duplicate code is to remove the duplication using one or more refactoring methods. Improving design by removing duplicate code reduces bloat and may result in only one code element to change at some later date should a programmer desire to change functionality. Refactoring also may help the programmer better understand existing code, which in turn may help the programmer find bugs.

One skilled in the art may understand that "smells" differ from one code language to another and from one programming type to another. In object-oriented programming, in general, the following example code problems and corresponding "smells" and corrective refactor methods include:

Duplicate Code smell (excessive time to execute); refactor method: extract out the common bits into their own method (extract method) if code is in same class; if two classes duplicate code, (extract class) to create a new class to hold the shared functionality.

Long Methods smell (similar to Duplicate Code); refactor method: (extract method)

Large Class smell (class trying to do too much, too many instance variables); refactor method: (extract class).

Long Parameter List smell (excessive time to execute); refactor method: (replace parameter with method) (where a receiver explicitly asks a sender for data via sender getter method—for example: year, month, day, hour, minute, second==>date).

Divergent Change smell (a fixed class that does distinctly different things refactor method: (extract class) to separate out the varying code into a varying subclass that is contained by the non-varying class.

Shotgun Surgery smell (a change in one class repeatedly requires small changes in other classes); refactor method: (move method) and (move field) to get all the bits that are obviously dependent into one class.

Feature Envy smell (excessive time to execute, method in a first class uses code snippets from a second class); refactor method: (move method) to move the first class into the second class.

Data Clumps smell (data objects that repeatedly appear together (e.g., name, street, zip code) as apparently independent data objects); extractor method: (extract class) for the data (resulting in name, street, zip code passed as one address object).

Lazy Class smell (class appears to never produce an output); extractor method: (delete) (to delete the class).

Inline Class smell (class provides no discernable output); extractor method: (inline class) (moves the original class' methods and fields to the class using the methods and fields and deletes original class).

Incomplete Library Class smell (method missing from library (library cannot be changed)); extractor method (introduce foreign method) (making method yourobject) or introduce local extension (making yourown extension/subclass).

Class Name smell (a Class Name that is not descriptive of the class function); refactor method: (rename class) (note that this coding problem may best be resolved and corrected manually by a programmer since class naming may be subjective to the programmer and the SCA 50 may not specify any class names).

The above examples show that code problems may have a common manifestation or "smell." The examples further show that in some instances, the appropriate refactoring method depends not on the "smell," but rather on the specific code problems. Finally, a specific "smell" many be addressed by more than one refactor method (although the above examples list only one). For example, Feature Envy may be addressed by extract method, move method, and/or move field. The refactoring engine 193 may execute to automatically and autonomously (but in some instances, at predefined points in the code generation process such as, for example, when a programmer or the coding engine 190 saves a coding entry) detect certain of these coding issues and then, through an artificial intelligence process, apply corresponding extractor methods to correct and improve the code. For example, the refactoring engine 193 may determine that execution of a software module or code snippet takes longer than intended by the SCA 50, and that, moreover, the execution time increases as more programming is added to the target software system. However, a long and/or lengthening execution time could be symptomatic of more than one coding issue. The refactoring engine 193 then would apply some or all of a number of extractor methods in a serial or sequential manner, observe the improvement (if any) after each iteration, and determine based, for example, on a "best" improvement, which extractor method (or methods) should be applied to the software module or code snippet. Since, historically, the most frequent cause of lengthening execution time is duplicate code, the refactoring engine 193 might, as a first iteration, start with searching for and deleting duplicate lines of code, assess the effects of such deletions, and then as a second iteration, move to the next refactor method. In an aspect, code is returned to its original state after an iteration so as to independently evaluate the refactor method's effect on the software module or code snippet. In another aspect, the possible refactor methods are applied serially, based on an order learned by the refactoring engine 193, and the improvement is noted after an iteration. The refactoring process proceeds until no further improvement in the measure being tested (in this example, execution time) is observed by the refactoring engine 193. In yet another aspect, the refactoring engine 193 executes according to the first and second aspects noted above, and notes any difference in a specific measure to be tested, where a difference suggests a dependence on the order of extractor method application. If such a difference is detected, the refactoring engine 193 may execute permutations of the order to identify the "best" order. However, a likely result is that only one refactor method produces a statistically significant change in the measure to be tested. In addition to testing a specific measure, the refactoring engine 193, after an iteration, verifies that the applied refactor method has not altered or otherwise affected to the behavior of the software module or code snippet. Any refactor method that affects behavior would be discarded. For example, if a code snippet is intended to produce an output X, and after refactoring, produces an output Y, the refactor method would not be used in a final refactoring to the code snippet.

In another aspect, the processor 61 (FIG. 2) in an automatic and autonomous process may determine an optimum sequence of refactor methods. The effect of a refactor method may be measured in terms of a value associated with the number of "smells" or another measure of the potential effects of the smells that may be addressed ("e.g., smells removed) by a refactor method as well as the potential improvement in the values of software metrics, or other software factors. Thus, a value V=sum (value v1 of smells addressed)+(value v2 of improved software metrics). The processor 61 may determine V for all identified smells and apply the resulting refactor method. However, the order in which refactor methods are applied may affect the value V for subsequent refactor methods; that is, the sequence of refactor methods is not independent. Furthermore, the value V may consist of conflicting elements such as conflicting software metrics (e.g., reusability may conflict with complexity, coupling may conflict with cohesion), and a heuristic optimization may be used to determine a combination of the value V components. The optimization may be determined by using genetic algorithms or any hill climbing optimization routine. Finally, the optimal value V may result from a sequence of refactor methods that produce the highest software quality measures with all smells removed from the software class or software module after applying the optimal sequence of refactor methods.

The efficiency, precision, and reliability of refactoring engine 193 in terms of improving the structure of the re-engineered software system may be enhanced by incorporation of one or more additional machine learning and artificial intelligence techniques that may be invoked in its automatic and autonomous mode of operation.

Both the coding engine 190 and the refactoring engine 193 use the code formatter 195 to translate the abstract syntax tree into the target language. Different target languages can be supported by the code formatter 195. With this approach it is possible, with additional functionality, to also convert one language to another.

Figure 8:
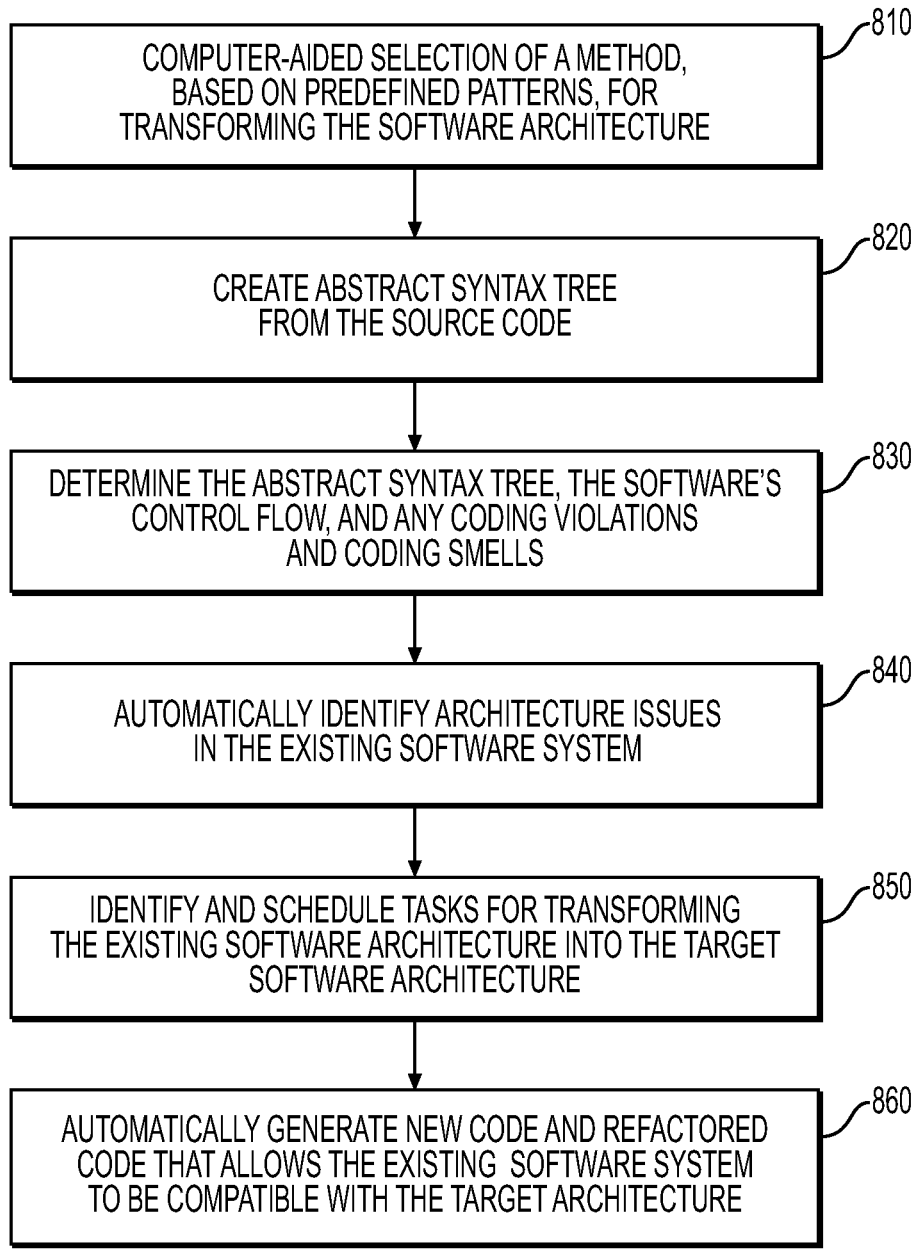
FIGS. 8-10 are flowcharts illustrating example operations of the example system of FIG. 2.
Figure 9:
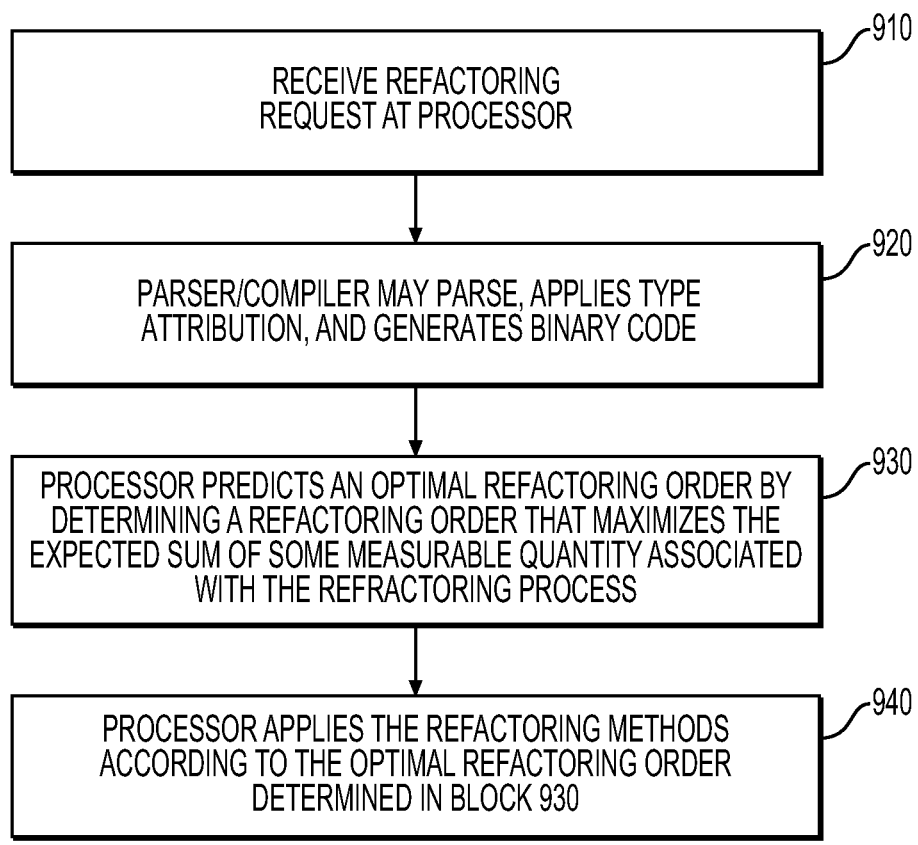
Figure 10:
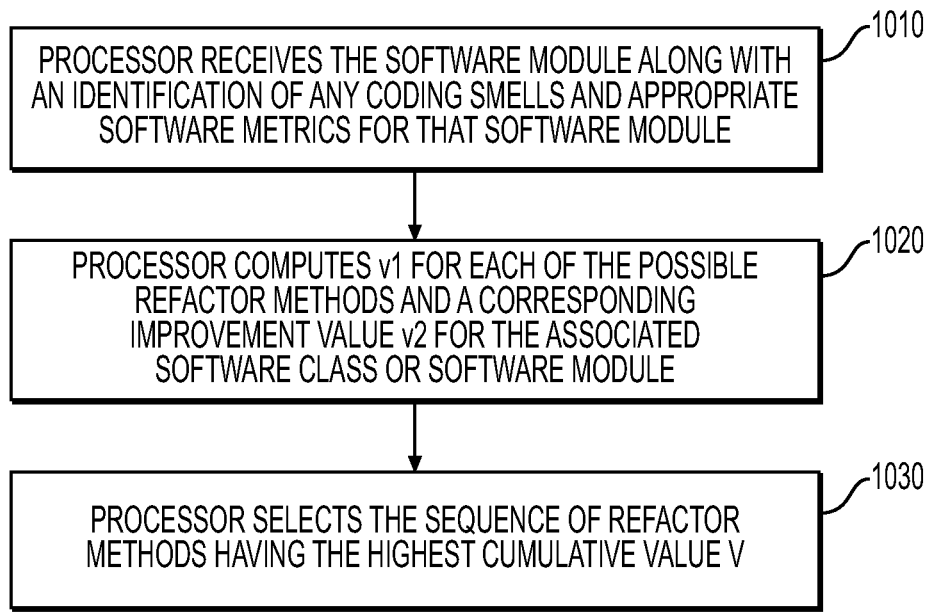

FIGS. 8-10 are flowcharts illustrating example operations/processes resulting from execution of the migration system 100 of FIG. 2. In general, the example operations change the software architecture of an existing, typically monolithic, software system to a well-defined modular (target) software architecture. Example operation 800, shown in FIG. 8, begins in block 810 with the computer-aided selection of a method, based on predefined patterns, for transforming the software architecture. In block 820, an abstract syntax tree is created from the source code, which may be in one or more computer languages. The operation 800 then moves to block 830, where the abstract syntax tree, the software's control flow, and any coding violations are determined. In addition, any coding smells in the legacy software system's source code may be determined. Such coding smells may be addressed (e.g., corrected or resolved) as part of the process of block 830, or at a later time. Block 840 combines the output of block 810-830 to automatically identify architecture issues in the existing software system. Block 840 may be a semi-automated process that compares data elements in the existing software system to those defined by the target architecture and identifies compatibilities and incompatibilities. Block 850 uses the output of blocks 810-840 to identify and schedule tasks for transforming the existing software architecture into the target software architecture. The tasks may be scheduled so that the transformation process is performed iteratively, where some iterations result in a working system, with an updated software architecture, until the target software architecture is achieved. In block 860, the coding engine 190 automatically generates new code and refactored code that allows the existing software system to be compatible with the target architecture. The refactored code optionally may be converted to a new computer language. For the case of an iterative approach, once the existing software system has been transformed, the processes of blocks 820-860 may be repeated.

FIG. 9 illustrates example refactoring operations of block 860 in more detail. In FIG. 9, process 860A executes to determine an optimum order of refactoring methods. Process 860A a begins in block 910 when (and referring also to FIG. 2), a request for refactoring is received at processor 61. For example, the process 860A may start with the receipt of one or more code files. In block 920, a parser/compiler (which may be a component of the migration system 100) may parse, apply type attribution, and generate binary code. The parser/compiler may include one or more components that can recognize expressions using a known syntax and then generate suitable program components that provide functionality associated with the known syntax. In other examples, the code may be retrieved from the memory 63. Additionally or alternatively, the refactoring process 860A may start at predetermined instances. In block 930, the processor 61 may predict an optimal refactoring order by, for example, determining a refactoring order that maximizes the expected sum of some measurable quantity associated with the refactoring process 860A. In one example of an automated and autonomous refactoring process, all bad smells in a software module and all software metrics relevant to that software module may be used to predict the optimal refactoring order. In other examples, including a semi-automated, non-autonomous refactoring process, the processor 61 may provide the programmer with a user interface to select one or more bad smells and one or more software metrics. For example, the user may be presented with a drop-down menu or other selection control for identifying the one or more bad smells and the one or more software metrics. In this second example, the processor 61 determines the optimal refactoring order based on the one or more bad smells and the one or more software metrics selected by the user. In block 940, the processor 61 applies the refactoring methods according to the optimal refactoring order determined in block 930.

FIG. 10 illustrates example refactoring operations of block 930 in more detail. In FIG. 10, automated and autonomous process 930A begins in block 1010 when the processor 61 receives the software module along with an identification of the smells and appropriate software metrics for that software module. As an example, the smells may include Feature Envy and Shotgun Surgery and the refactor methods may include methods that may address multiple instances of these smells. Note that the coding smells may pertain to the new source code as it is developed in addition to any legacy source code that may be reused. In block 1020, the processor computes v1 for each of the possible refactor methods and a corresponding improvement value v2 for the associated software class or software module. The processor may complete the value computation for all possible iterations and sequences (orders) of the refactor methods. In block 1030, the processor selects the sequence of refactor methods having the highest cumulative value V.

Certain of the devices shown in FIGS. 1A-2 include a computing system. The computing system includes a processor (CPU) and a system bus that couples various system components including a system memory such as read only memory (ROM) and random access memory (RAM), to the processor. Other system memory may be available for use as well. The computing system may include more than one processor, or a group or cluster of computing systems networked together to provide greater processing capability. The system bus may be any of several types of bus structures including a memory bus or memory controller, a peripheral bus, and a local bus using any of a variety of bus architectures. A basic input/output (BIOS) stored in the ROM or the like, may provide basic routines that help to transfer information between elements within the computing system, such as during start-up. The computing system further includes data stores, which maintain a database according to known database management systems. The data stores may be embodied in many forms, such as a hard disk drive, a magnetic disk drive, an optical disk drive, tape drive, or another type of computer readable media which can store data that are accessible by the processor, such as magnetic cassettes, flash memory cards, digital versatile disks, cartridges, random access memories (RAM) and, read only memory (ROM). The data stores may be connected to the system bus by a drive interface. The data stores provide nonvolatile storage of computer readable instructions, data structures, program modules and other data for the computing system.

To enable human (and in some instances, machine) user interaction, the computing system may include an input device, such as a microphone for speech and audio, a touch sensitive screen for gesture or graphical input, keyboard, mouse, motion input, and so forth. An output device can include one or more of a number of output mechanisms. In some instances, multimodal systems enable a user to provide multiple types of input to communicate with the computing system. A communications interface generally enables the computing device system to communicate with one or more other computing devices using various communication and network protocols.

The preceding disclosure refers to flowcharts and accompanying descriptions to illustrate the examples represented in FIGS. 8-10. The disclosed devices, components, and systems contemplate using or implementing any suitable technique for performing the steps illustrated. Thus, FIGS. 8-10 are for illustration purposes only and the described or similar steps may be performed at any appropriate time, including concurrently, individually, or in combination. In addition, many of the steps in the flow chart may take place simultaneously and/or in different orders than as shown and described. Moreover, the disclosed systems may use processes and methods with additional, fewer, and/or different steps.

Examples disclosed herein can be implemented in digital electronic circuitry, or in computer software, firmware, or hardware, including the herein disclosed structures and their equivalents. Some examples can be implemented as one or more computer programs, i.e., one or more modules of computer program instructions, encoded on computer storage medium for execution by one or more processors. A computer storage medium can be, or can be included in, a computer-readable storage device, a computer-readable storage substrate, or a random or serial access memory. The computer storage medium can also be, or can be included in, one or more separate physical components or media such as multiple CDs, disks, or other storage devices. The computer readable storage medium does not include a transitory signal.

The herein disclosed methods can be implemented as operations performed by a processor on data stored on one or more computer-readable storage devices or received from other sources.

A computer program (also known as a program, module, engine, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

We claim:

1. A software migration system for adapting an architecture and program language of legacy software by migrating the legacy software to a new software system defined by a system common architecture, the software migration system, comprising:
    a processor;
    a user interface in communication with the processor that receives and displays components of the legacy software and the new software system, the user interface comprising a visual display and controls for sending selections to the processor; and
    a migration program comprising machine instructions stored on a non-transitory, computer-readable storage medium, wherein the processor executes the machine instructions to:
        identify reference models, standards, and requirements of the system common architecture that together define a process for migrating the legacy software to the new software system,
        load the legacy software onto a virtual machine instantiated on a dedicated hardware platform,
        refactor the legacy software,
        subdivide the refactored legacy software into two or more legacy software subsets,
        move a first legacy software subset to a second virtual machine instantiated on the dedicated hardware platform,
        for a second legacy software subset, adapt the second legacy software subset to the system common architecture, comprising:
            transforming the second legacy software subset according to the system common architecture, and
            refactoring the transformed second legacy software subset, wherein an adapted second legacy software subset is produced; and combine the adapted second legacy software subset and the first legacy software subset, wherein the new software system is produced.

2. The system of claim 1, wherein to refactor the legacy software, the processor:
autonomously and automatically generates an abstract syntax tree from the legacy software;
autonomously and automatically parses the legacy software into a plurality of software elements;
autonomously and automatically identifies a plurality of design problems in each of the software elements;
automatically and autonomously determines one or more corrections to one or more of the design problems; and
completes the refactoring of the software elements by implementing the corrections, thereby producing refactored legacy software.

3. The system of claim 2, wherein the processor:
presents, in the user interface, the plurality of design problems and corresponding corrections; and
receives, through the user interface, user selections of corrections to the design problems.

4. The system of claim 2, wherein the machine instructions comprise instructions for implementing a code parser, and wherein the processor:
receives one or more source code files;
applies the code parser to parse the one or more source code files to generate binary code; and
predicts an optimum refactoring order for the adapted second legacy software subset, comprising determining a refactoring order that maximizes an expected sum of two or more measurable quantity terms associated with a refactoring order.

5. The system of claim 4, wherein the code parser comprises one or more components configured to recognize expressions using a known syntax and to generate suitable program components that provide desired functionality associated with the known syntax.

6. The system of claim 4, comprising:
the processor determining and applying a plurality of potential orders of refactoring of the legacy software;
the processor identifying an optimum order from the plurality of potential refactoring orders; and
the processor executing the legacy software refactoring according to the optimum order.

7. The system of claim 6, wherein after one or more refactoring steps, the processor determines that behavior of the second software subset is unchanged.

8. The system of claim 4, comprising:
the processor determining and applying a plurality of potential orders of refactoring the adapted second software subset;
the processor presenting the potential orders of refactoring for display through the user interface;
the processor receiving, through the user interface, an optimum order from the plurality of potential refactoring orders; and
the processor executing the second software subset refactoring according to the optimum order.

9. The system of claim 1, wherein the system common architecture comprises pre-defined elements, and wherein transforming the refactored legacy software into the new software system conforming to the system common architecture, comprises:
generating by the processor, an architectural model of the legacy software system including identifying the legacy elements of the legacy software system;
identifying, by the processor, differences and commonalities between an architectural model of the legacy software system and the system common architecture by mapping, within the user interface, the pre-defined elements of the system common architecture to the legacy elements of the legacy software system;
based on the differences and the commonalities, determining legacy elements of the legacy software system to be transformed and legacy elements of the legacy software system to be reused;
producing a schedule of transformation and reuse tasks and displaying the schedule in the user interface; and
receiving a selection through the user interface to execute the schedule.

10. A non-transitory, computer-readable storage medium having stored thereon, machine instructions for migrating legacy software to a new software system having a system common architecture, wherein a processor executes the machine instructions to:
identify reference models, standards, and requirements of the system common architecture that together define a process for migrating the legacy software to the new software system;
load the legacy software onto a virtual machine instantiated on a dedicated hardware platform;
refactor the legacy software;
subdivide the refactored legacy software into two or more legacy software subsets;
move a first legacy software subset to a second virtual machine instantiated on the dedicated hardware platform;
for a second legacy software subset, adapt the second legacy software subset to the system common architecture, comprising:
transforming the second legacy software subset according to the system common architecture, and
refactoring the transformed second legacy software subset, wherein an adapted second legacy software subset is produced; and
combine the adapted second legacy software subset and the first legacy software subset, wherein the new software system is produced.

11. The non-transitory, computer-readable storage medium of claim 10, wherein the processor executes the machine instructions to:
autonomously and automatically generate an abstract syntax tree from the legacy software;
autonomously and automatically parse the legacy software into a plurality of software elements;
autonomously and automatically identify a plurality of design problems in each of the software elements;
automatically and autonomously determine one or more corrections to one or more of the design problems; and
complete the refactoring of the software elements by implementing the corrections, thereby producing refactored legacy software.

12. The non-transitory, computer-readable storage medium of claim 10, wherein the processor executes the machine instructions to:
implement a code parser:
receives one or more source code files;
applies the code parser to parse the one or more source code files to generate binary code; and
predicts an optimum refactoring order for the adapted second legacy software subset, comprising determining a refactoring order that maximizes an expected sum of two or more measurable quantity terms associated with a refactoring order.

13. A computer-implemented method for migrating legacy software to a new software system having a system common architecture, comprising:
   a processor identifying reference models, standards, and requirements of the system common architecture that together define a process for migrating the legacy software to the new software system;
   the processor loading the legacy software onto a virtual machine instantiated on a dedicated hardware platform;
   refactoring the legacy software;
   subdividing the refactored legacy software into two or more legacy software subsets;
   moving a first legacy software subset to a second virtual machine instantiated on the dedicated hardware platform;
   for a second legacy software subset, adapting the second legacy software subset to the system common architecture, comprising:
      transforming the second legacy software subset according to the system common architecture, and
      refactoring the transformed second legacy software subset, wherein an adapted second legacy software subset is produced; and
   combining the adapted second legacy software subset and the first legacy software subset, wherein the new software system is produced.

14. The method of claim 13, comprising:
   autonomously and automatically generating an abstract syntax tree from the legacy software;
   applying a parser to autonomously and automatically parse the legacy software into a plurality of software elements;
   autonomously and automatically identifying a plurality of design problems in each of the software elements;
   automatically and autonomously determining one or more corrections to one or more of the design problems; and
   completing the refactoring of the software elements by implementing the corrections, thereby producing refactored legacy software.

15. The method of claim 13, comprising:
   the processor implementing a code parser:
   receiving one or more source code files;
   applying the code parser to parse the one or more source code files to generate binary code; and
   predicting an optimum refactoring order for the adapted second legacy software subset, comprising determining a refactoring order that maximizes an expected sum of two or more measurable quantity terms associated with a refactoring order.

16. The method of claim 15, wherein after one or more refactoring steps, the processor determines that behavior of the source code files is unchanged.

17. The method of claim 15, comprising:
   the processor determining and applying a plurality of potential orders of refactoring the adapted second software subset;
   presenting the potential orders of refactoring for display through a user interface;
   receiving, through the user interface, an optimum order from the plurality of potential refactoring orders; and
   the processor executing the second software subset refactoring according to the optimum order.

18. The method of claim 13, wherein the system common architecture comprises pre-defined elements, and wherein transforming the refactored legacy software into the new software system conforming to the system common architecture, the method comprising:
   generating by the processor, an architectural model of the legacy software system including identifying the legacy elements of the legacy software system;
   identifying, by the processor, differences and commonalities between an architectural model of the legacy software system and the system common architecture by mapping, within a user interface, the pre-defined elements of the system common architecture to the legacy elements of the legacy software system;
   based on the differences and the commonalities, determining legacy elements of the legacy software system to be transformed and legacy elements of the legacy software system to be reused;
   producing a schedule of transformation and reuse tasks and displaying the schedule in the user interface; and
   receiving a selection through the user interface to execute the schedule.

* * * * *